United States Patent
Schmitt et al.

(10) Patent No.: US 7,529,473 B2
(45) Date of Patent: May 5, 2009

(54) SCALABLE IMAGE CAPTURE ON WIRELESS COMMUNICATION DEVICE

(75) Inventors: Dan Schmitt, San Diego, CA (US); Jolynn Bories, Morris Plains, NJ (US)

(73) Assignee: Kyocera Wireless Corp., San Diego, CA (US)

( * ) Notice: Subject to any disclaimer, the term of this patent is extended or adjusted under 35 U.S.C. 154(b) by 484 days.

(21) Appl. No.: 11/174,178

(22) Filed: Jun. 29, 2005

(65) Prior Publication Data

US 2007/0003266 A1 Jan. 4, 2007

(51) Int. Cl.
*G03B 41/00* (2006.01)
(52) U.S. Cl. .......................... 396/14; 396/56; 382/115; 382/305; 382/306
(58) Field of Classification Search ................ 382/115, 382/305, 306; 396/14, 56; 386/14
See application file for complete search history.

(56) References Cited

U.S. PATENT DOCUMENTS

| 6,622,031 | B1 * | 9/2003 | McCleary et al. ........ 455/575.7 |
| 2001/0027098 | A1 * | 10/2001 | Suzuki ........................ 455/415 |
| 2002/0035522 | A1 * | 3/2002 | Pilcher ........................ 705/28 |
| 2002/0109770 | A1 * | 8/2002 | Terada ...................... 348/14.08 |
| 2005/0104988 | A1 * | 5/2005 | Su et al. .................. 348/333.12 |

OTHER PUBLICATIONS http://web.archive.org/web/20000819052731/http://www.evolutionary.net/aalb-info.htm.*
http://web.archive.org/web/*/http://www.evolutionary.net/aalb-info.htm.*
"Strobel" (http://web.archive.org/web/20030407092423/http://www.pspilot.de/pppnr70/pppnr70.html).*
"Hardy" (http://web.archive.org/web/20020620182518/http://palminfocenter.com/view_story.asp?ID=3411).*
"Hardy archive" (http://web.archive.org/web/*/http://www.palminfocenter.com/view_story.asp?ID=3411).*
"Stobel archive" (http://web.archive.org/web/*/http://www.pspilot.de/pppnr70/pppnr70.html).*

* cited by examiner

*Primary Examiner*—W. B. Perkey
*Assistant Examiner*—Michael A Strieb

(57) ABSTRACT

Systems and methods for capturing optimally sized Picture ID images are provided that allow a wireless communication device to modify the size of the camera viewfinder when capturing an image to be used as a Picture ID. During the capture of a Picture ID image, the camera viewfinder image area is optimally sized for the capture of an image to be stored as a Picture ID image. When a Picture ID image is captured, any excess image data that is outside of the optimally sized camera viewfinder is discarded and the remaining optimally sized image stored with the contact record.

14 Claims, 3 Drawing Sheets

SCALABLE IMAGE CAPTURE ON WIRELESS COMMUNICATION DEVICE

FIELD OF THE INVENTION

The present invention generally relates to wireless communication devices and more particularly relates to camera enabled wireless communication devices with picture identification address books.

BACKGROUND OF THE INVENTION

Conventional wireless communication devices typically include an address book for keeping track of contact information. More recently, address books have incorporated the ability to include a digital image as part of the identifying information for the contact ("Picture ID").

To include a Picture ID in the address book, a wireless communication device that is equipped with a digital camera typically captures an image of the person for use as the Picture ID in the address book entry for that person. However, the size of the captured image and the predetermined size of a Picture ID image are not the same and therefore the captured image must be reformatted and resized to fit the predetermined size of a Picture ID image. This reformatting and resizing is not only cumbersome on a wireless communication device, but it usually results in a Picture ID where the subject is very small within the Picture ID image due to the necessary shrinking of the image to fit the predetermined size of a Picture ID image. Accordingly, what is needed is a system and method that overcomes these problems with the conventional systems.

SUMMARY

Accordingly, to meet the expected demands of the industry and consumers, systems and methods for scalable image capture on a wireless communication device to create optimally sized Picture IDs are disclosed herein.

A wireless communication device is configured to modify the size of the camera viewfinder when capturing an image to be used as a Picture ID. During the capture of a Picture ID image, the camera viewfinder may be placed in the location of the screen area where Picture IDs are displayed in a contact record. The related contact information may also be provided on the screen along with the camera viewfinder. The camera viewfinder may also be located in the center of the screen area without related contact information.

When the wireless communication device receives the command to capture a Picture ID, the handset captures the image and then discards any excess image data that is outside of the optimally sized camera viewfinder and the remaining optimally sized image stored with the contact record.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Disclosed herein are systems and methods that allow a wireless communication device to capture an optimally sized picture identification image for storage in a contact record. For example, one method described herein allows for a wireless communication device to use the picture identification image area as the camera viewfinder when capturing an image to be used as a picture identification.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
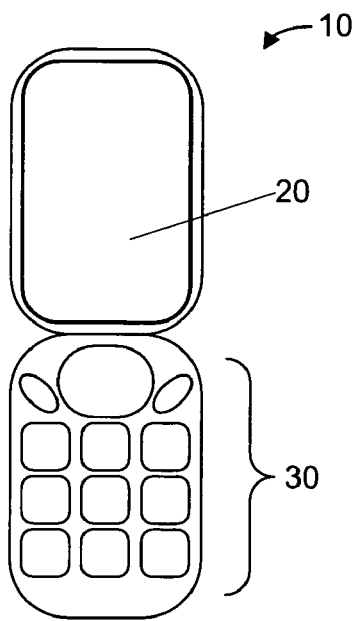
FIG. 1 is a block diagram illustrating an example front view of a handset according to an embodiment of the present invention.

FIG. 1 is a block diagram illustrating an example front view of a handset 10 according to an embodiment of the present invention. In the illustrated embodiment, the handset 10 comprises a screen area 20 and a set of keys 30. The keys 30 provide an external input for the user to interact with the handset 10. The display area 20 provides a graphical user interface for the handset 10 to present information to the user.

Handset 10 can be any of a variety of wireless communication devices including cellular telephones, personal digital assistants and the like. Handset 10 is also configured with an image capture device that allows the handset 10 to capture digital images for storage in internal or external memory of the handset 10.

Figure 2:
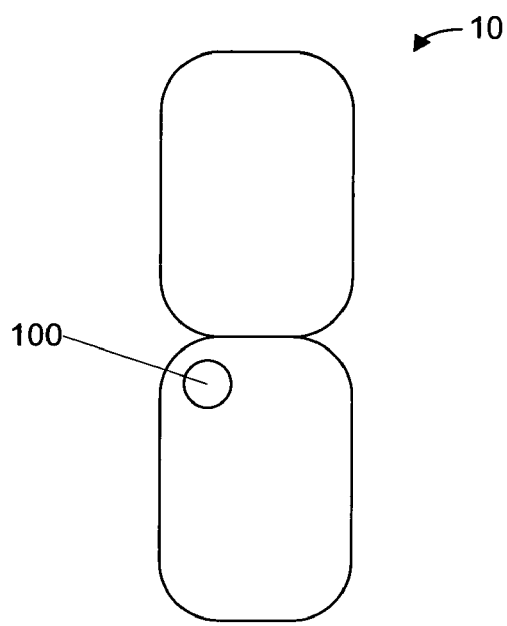
FIG. 2 is a block diagram illustrating an example back view of a handset according to an embodiment of the present invention.

FIG. 2 is a block diagram illustrating an example back view of a handset 10 according to an embodiment of the present invention. In the illustrated embodiment, the handset 10 is configured with an integral camera lens 100. Alternatively, handset 10 may be adaptable for use with an external image capture device. Various internal or external camera alternatives are contemplated by the breadth of the present description.

Figure 3:
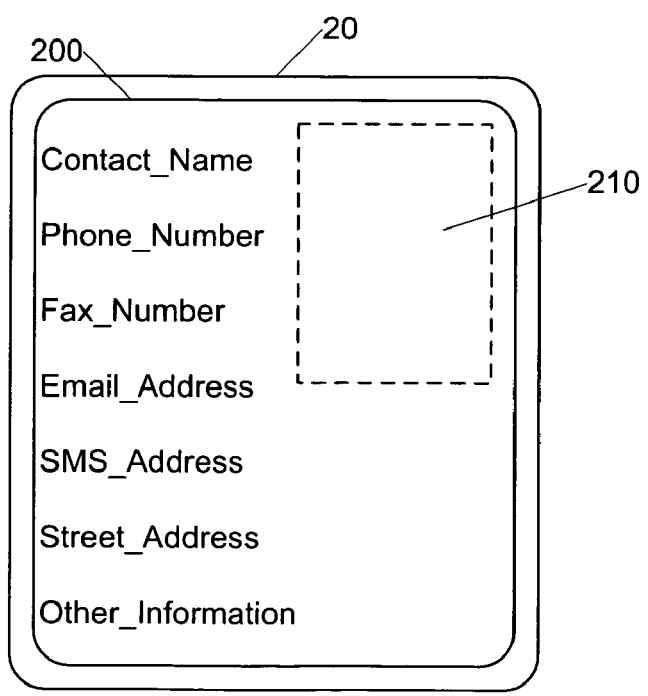
FIG. 3 is a block diagram illustrating an example contact record with a picture identification image area according to an embodiment of the present invention.

FIG. 3 is a block diagram illustrating an example contact record 200 with a Picture ID image area 210 according to an embodiment of the present invention. In the illustrated embodiment, the contact record is displayed in the screen area 20 of a handset and the Picture ID image area 210 disposed in the upper right corner of the contact record 200. In alternative embodiments, different locations for the information content of the contact record 200 and the Picture ID image area 210 can be arranged.

In alternative embodiments and on alternative wireless communication devices, the size of the Picture ID image area 210 can be limited by the pixel area or by physical size. Picture ID images may be captured at a variety of resolutions limited only by the ability of the integrated or external camera device.

Figure 4:
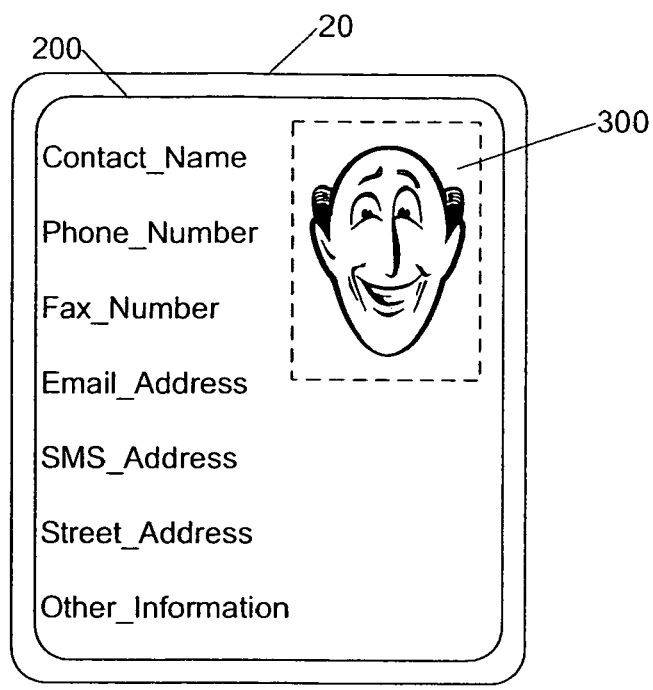
FIG. 4 is a block diagram illustrating an example camera viewfinder area integrated with an example contact screen according to an embodiment of the present invention.

FIG. 4 is a block diagram illustrating an example camera viewfinder area 300 integrated with an example contact screen 200 according to an embodiment of the present invention. In the illustrated embodiment, the contact screen 200 is presented on the display 20 of a wireless communication device. During image capture of a Picture ID image, the camera viewfinder 300 shows the subject matter that is being viewed by the integral or external camera device. The user is able to move the lens of the camera device closer to the subject, or otherwise adjust the camera lens, in order to capture a Picture ID image that is optimally sized for storage in the contact record. For example, images captured using the entire screen area 20 as the camera viewfinder when compressed to fit within the Picture ID image area in a contact record are highly unusable because the subject appears too small. Accordingly, the camera viewfinder area 300 is reduced to the size of the Picture ID image area so that the user can capture an image that is optimal for use as a Picture ID image. For example in one embodiment, the size of the captured image corresponding to the camera viewfinder area 300 has an image resolution substantially equal to the image resolution stored for the Picture ID field for the contact record.

Figure 5:
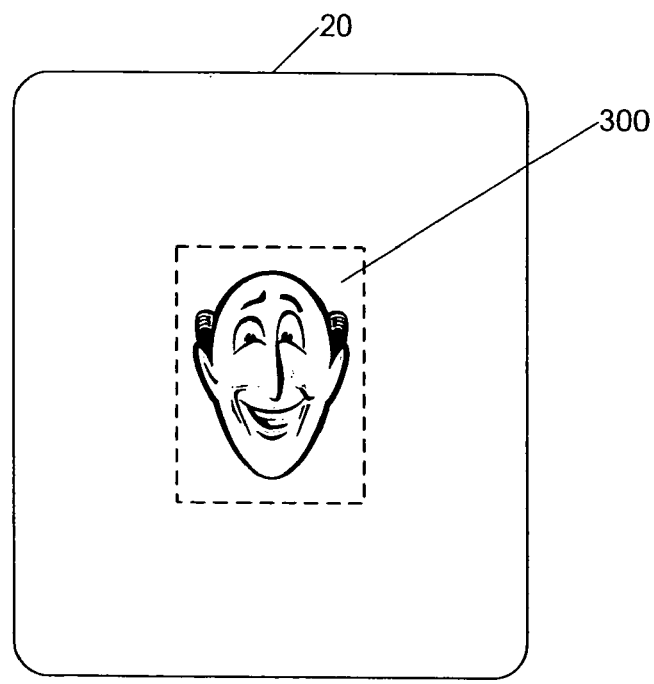
FIG. 5 is a block diagram illustrating an example camera viewfinder area for capturing a Picture ID image according to an embodiment of the present invention.

FIG. 5 is a block diagram illustrating an example camera viewfinder area 300 for capturing a Picture ID image according to an embodiment of the present invention. In the illustrated embodiment, the camera viewfinder area 300 is placed in the center of the screen area 20 of the handset. The area around the camera viewfinder area 300 may alternatively be blank or may be obscured in some fashion to indicate to a user that the camera viewfinder area 300 is the image that will be stored as the Picture ID image.

For example, in one embodiment the area outside of the camera viewfinder area 300 may be darkened or lighted. Advantageously, the user may still see the entire surrounding image area that is viewable through the lens of the camera so that the user can correctly and conveniently orient the subject in the camera viewfinder area 300.

Figure 6:
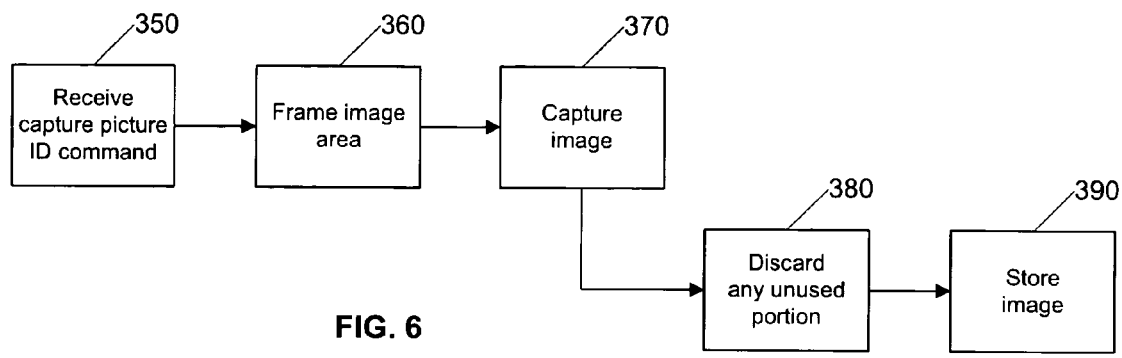
FIG. 6 is a flow diagram illustrating an example process for capturing a contact picture identification image according to an embodiment of the present invention.

FIG. 6 is a flow diagram illustrating an example process for capturing a contact picture identification image according to an embodiment of the present invention. Initially, in step 350, the handset receives a command instructing it to capture a Picture ID. In response to the command, the handset frames the image area for the camera viewfinder in step 360 and presents the framed camera viewfinder image area on the display of the handset. This presentation may be, for example, in the context of the contact record as previously discussed with respect to FIG. 4. The presentation may also be, for example, in the center of the screen area of the handset with the perimeter portions obscured in some fashion or completely blank.

Advantageously, the camera viewfinder area is optimally sized so that any image captured in the camera viewfinder area is also optimally sized for storage as a Picture ID in a contact record on the handset. Although the size of Picture IDs for contact records may vary from handset to handset, in one embodiment this size is a configurable parameter that can be modified by the user.

Once the camera viewfinder area is presented to the user, the user can then locate the desired subject in the camera viewfinder area and capture the image, as illustrated in step 370. In one embodiment, the camera next discards the perimeter portion of the image captured by the camera device (at step 380) so that the remaining image includes the subject matter from the camera viewfinder image area. Alternatively, the subject matter in the captured image may be coextensive with the subject matter from the camera viewfinder image area. Differences between the actual captured subject matter and the subject matter from the camera viewfinder image area may exist based upon the sophistication of the camera device and its ability to capture images using less than all of the sensors of the camera device. In one embodiment, a camera device may be configurable to capture an image using less than all of its pixel sensors.

Alternatively, a camera device may capture an image using all of its pixel sensors regardless of the displayed camera viewfinder image area. In such an embodiment, the handset may, after the image is captured in step 370, discard the perimeter of the captured image so that the central portion of the image (that portion from the camera viewfinder image area) remains. It should be noted that the camera viewfinder image area may, in different embodiments, be the center portion of the subject matter seen through the lens of the camera or some other portion such as the upper right portion, the upper left portion, the lower left portion or the lower right portion.

Next at step 390, the captured image (the entire image or the remaining portion of the image) is stored as the Picture ID for a contact record. In one embodiment, the relevant contact record may be identified prior to capturing the Picture ID. Alternatively, the user may select a contact record after capturing the Picture ID.

Figure 7:
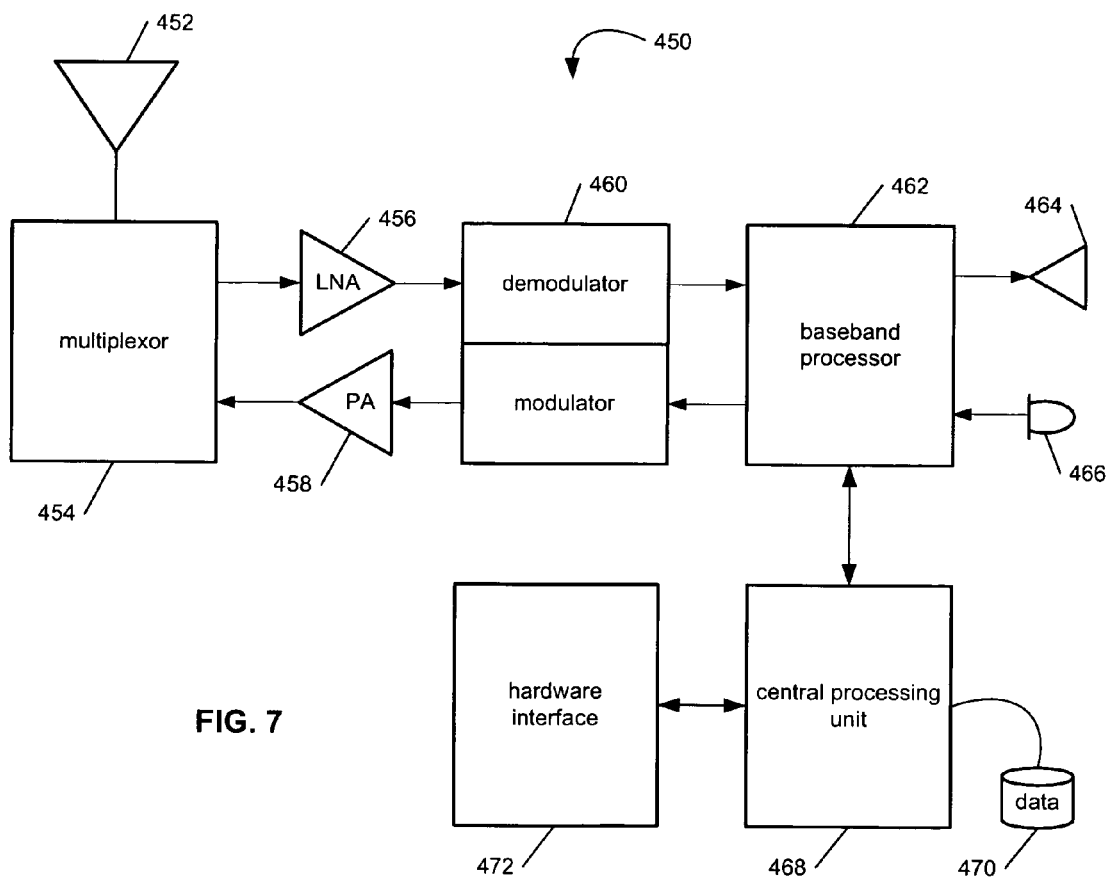
FIG. 7 is a block diagram illustrating an exemplary wireless communication device that may be used in connection with the various embodiments described herein.

FIG. 7 is a block diagram illustrating an exemplary wireless communication device 450 that may be used in connection with the various embodiments described herein. For example, the wireless communication device 450 may be used in conjunction with a mobile handset as described above with respect to FIGS. 1 and 3. However, other wireless communication devices and/or architectures may also be used, as will be clear to those skilled in the art.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. The multiplexor 454, LNA 456, PA 458, and modulation circuit 460 can be collectively referred to as a transceiver. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator converts the received RF signal to a base-band receive signal, which is sent from the demodulator output to the base-band processor 462.

If the base-band receive signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

For example, data storage area 470 may include a camera viewfinder image area module (not shown) that when executed provides an optimally sized frame to the user of the handset within which the subject matter seen through the lens of the camera device is provided. The camera viewfinder image area module may present this subject matter in the center of the handset display or in the location where a Picture ID would be presented when a contact record is presented on the handset display. Additionally, the camera viewfinder image area module may, as previously described, obscure the subject matter from the camera device that is outside of the camera viewfinder image area so that it is clear to a user what portion of the raw subject matter will be captured as the Picture ID.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer implemented method for capturing an image on a wireless communication device for use as a picture identification image in a contact record on the wireless communication device, comprising:

displaying a contact record on the display of the wireless communication device, the contact record having a picture identification image area;

receiving at the wireless communication device an instruction to capture a picture identification image;

displaying a camera viewfinder image area on a display device of the wireless communication device, the camera viewfinder image area located in the picture identification image area of the contact record being displayed;

capturing an image of the subject matter within the camera viewfinder image area; and storing the captured image as a picture identification image in said contact record.

2. The method of claim 1 wherein the captured image is the image data framed within the camera viewfinder image area.

3. The method of claim 2 wherein the captured image has an image resolution substantially equal to the image resolution for the picture identification image in a contact record.

4. The method of claim 1 further comprising discarding captured image data not stored as the picture identification.

5. The method of claim 1 wherein the camera viewfinder image area is presented in the center of the display device.

6. A wireless communication device comprising:
a processor;
a transceiver coupled to the processor;
an antenna coupled to the transceiver;
a display device coupled to the processor;
a memory coupled to the processor, the memory having stored thereon one or more sequences of executable instructions for causing the processor to perform the steps for capturing an image for use as a picture identification image in a contact record on the wireless communication device, the steps including:
displaying a contact record on the display of the wireless communication device, the contact record having a picture identification image area;
receiving an instruction to capture a picture identification image;
displaying a camera viewfinder image area on the display device, the camera viewfinder image area located in the picture identification image area of the contact record being displayed;
capturing an image of the subject matter within the camera viewfinder image area; and
storing the captured image as a picture identification image in a said contact record.

7. The device of claim 6 wherein the captured image is the image data framed within the camera viewfinder image area.

8. The device of claim 7 wherein the captured image has an image resolution substantially equal to the image resolution for the picture identification image in a contact record.

9. The device of claim 6 wherein the method further comprises discarding captured image data not stored as the picture identification.

10. The device of claim 6 wherein the camera viewfinder image area is presented in the center of the display device.

11. A wireless communication device comprising:
processing means;
memory means coupled to the processing means;
transceiver means coupled to the processing means;
antenna means coupled to the transceiver means;
display means coupled to the processing means;
means for displaying a contact record on the display of the wireless communication device, the contact record having a picture identification image area;
means for receiving an instruction to capture a picture identification image;
means for displaying a camera viewfinder image area on the display means, the camera viewfinder image area located in the picture identification image area of the contact record being displayed
means for capturing an image of the subject matter within the camera viewfinder image area; and
means for storing the captured image as a picture identification image in a said contact record.

12. The device of claim 11 wherein the captured image is the image data framed within the camera viewfinder image area.

13. The device of claim 12 wherein the captured image has an image resolution substantially equal to the image resolution for the picture identification image in a contact record.

14. The device of claim 11 further comprising means for discarding captured image data not stored as the picture identification.

* * * * *

UNITED STATES PATENT AND TRADEMARK OFFICE
CERTIFICATE OF CORRECTION

| | | |
|---|---|---|
| PATENT NO. | : 7,529,473 B2 | Page 1 of 1 |
| APPLICATION NO. | : 11/174178 | |
| DATED | : May 5, 2009 | |
| INVENTOR(S) | : Dan Schmitt et al. | |

It is certified that error appears in the above-identified patent and that said Letters Patent is hereby corrected as shown below:

Column 7,
Line 35, delete "in a said contact record." and replace with -- in said contact record. --

Column 8,
Line 26-27, delete "identification image in a said contact record." and replace with -- identification image in said contact record. --

Signed and Sealed this

Seventh Day of August, 2012

David J. Kappos
*Director of the United States Patent and Trademark Office*